Patented Aug. 11, 1936

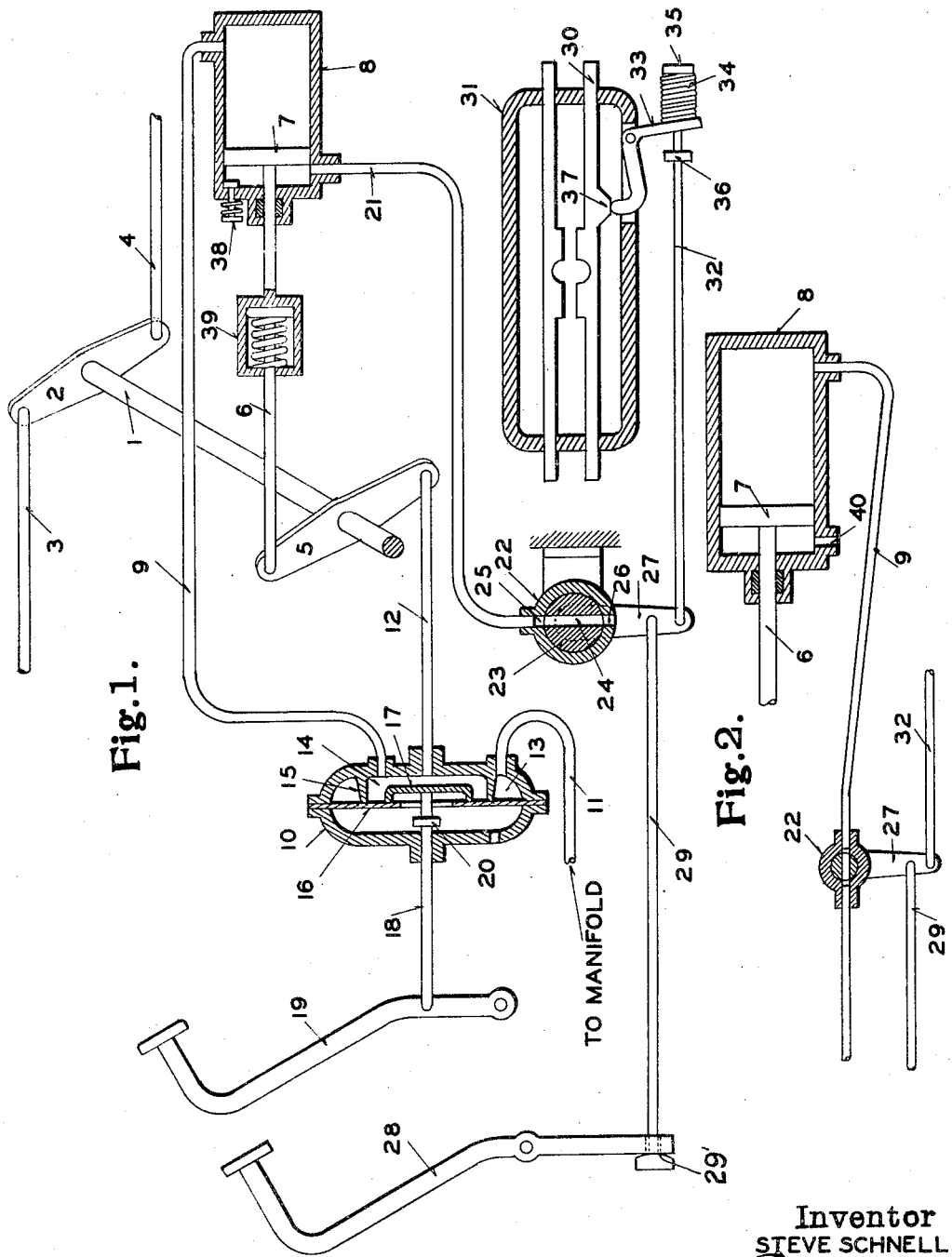

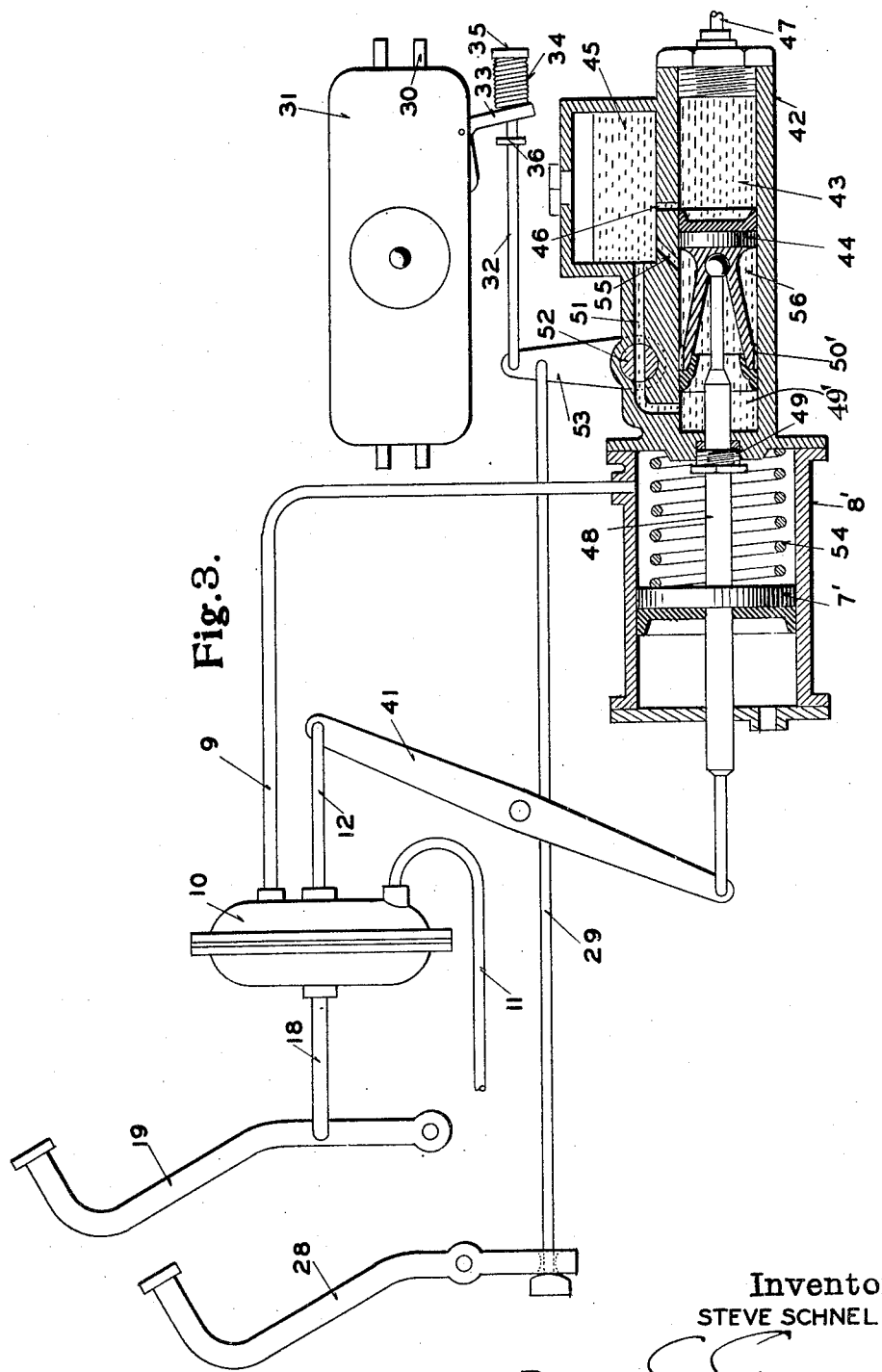

2,050,466

UNITED STATES PATENT OFFICE 2,050,466

BRAKE CONTROL MECHANISM

Steve Schnell, Overland, Mo., assignor to Wagner Electric Corporation, St. Louis, Mo., a corporation of Delaware Application November 9, 1932, Serial No. 641,814

17 Claims. (Cl. 192—4)

My invention relates to power-operated brakes and more particularly to their control by the clutch mechanism and the transmission mechanism of a motor vehicle.

One of the objects of my invention is to provide means in combination with the power actuating means of the brake mechanism for holding the brakes in applied position after the power means has been released, said means being operable when the clutch is disengaged.

Another object of my invention is to provide means for rendering the holding means inoperative when an element of the change speed transmission is in a selected position.

Other objects of my invention will become apparent from the following description taken in connection with the accompanying drawings in which Figure 1 is a schematic view, partly in cross section, showing my invention in combination with the power-operated brake mechanism, the clutch mechanism, and the transmission mechanism; Figure 2 is a view showing a modified form of holding means; and Figure 3 is a view, partly in cross section, showing my invention applied to a power-actuated hydraulic brake system.

Referring in detail to Figure 1, the numeral 1 indicates the cross shaft of a vehicle which is provided at its ends with levers 2, (one only being shown) which are connected, in a well known manner, by the rods 3 and 4 to the front and rear brakes of a vehicle. The central portion of the cross shaft has secured thereto, a lever 5 for actuating the brakes, the upper arm of this lever being connected by means of a rod 6 to the piston 7 of the suction motor 8. The chamber of the suction motor ahead of the piston 7 is connected by means of conduit 9 with the control valve 10 which in turn is connected by conduit 11 with the manifold of the vehicle engine. This control valve is of well known construction, it being carried by the rod 12 which is connected to the lower arm of the lever 5. The conduit 11 is in communication with the valve chamber 13 and the conduit 9 in communication with the valve chamber 14, these chambers being separated by the annular wall 15 and controlled by the valve disc 16. The valve disc is actuated by means of the annular member 17 which is connected to the rod 18 which, in turn, is pivotally connected to the usual vehicle brake pedal 19.

From the above structure it is readily seen that when the brake pedal 19 is depressed, the member 17 will flex the valve disc 16, thereby placing the chamber 13 in communication with the chamber 14 and the suction motor in communication with the manifold, thus causing the piston 7 to be moved to the right to apply the brakes. Since the control valve 11 is carried by the brake rod 12, the valve disc will be reseated by the "follow-up" action of the rod 12, thereby moving the brakes a distance proportionate to the movement of the brake pedal. Additional movement of the brake pedal will reopen the valve and apply additional pressure to the brakes. Release of the brake pedal places the conduit 9 in communication with the atmosphere, thereby releasing the brakes. In order to provide for manual actuation of the brakes in case of failure of the power means, rod 18 is provided with a shoulder 20 for engagement with the valve casing, whereby the brake lever 5 may be directly actuated.

In accordance with my invention I have provided means for holding the brakes in applied position by preventing the piston 7 of the suction motor from returning to the released position of the brakes, this holding means being operable only when the clutch is disengaged. I have also provided means for causing the holding means to be inoperative when the change speed transmission of the vehicle is in its highest or next to the highest speed ratio and the clutch is disengaged.

The portion of the chamber of the suction motor at the left of the piston is in communication by means of conduit 21 with the cut-off valve 22. The rotatable member 23 of this valve is provided with an opening 24, whereby the conduit 21 is in communication with the atmosphere when the opening is in alignment with the ports 25 and 26 of the valve casing. The member 23 has secured thereto an arm 27 which is connected to the clutch pedal 28 by a rod 29, the connection with the pedal being by means of a slip joint 29'. The arm 27 is also connected to the high and next to high speed shifting rod 30 of the transmission 31 by means of the rod 32 and lever 33, the latter being pivoted to the transmission housing. The rod 32 extends through an opening in the outer end of the lever 33 and carries a compression spring 34, one end of which cooperates with the lever 33 and the other with a shoulder 35 on the rod. The rod 32 is also provided with a second shoulder 36 for direct engagement with the lever 33. The shifting rod 30 carries a lug 37 which, in the neutral position of the rod, causes the lever 33 to compress the spring 34, as shown.

In order to make the portion of the chamber of the suction motor to the rear of the piston fluid-tight, the rod 6 is suitably packed where it enters the chamber. The suction motor is also provided with a spring-loaded non-return valve 38 for permitting air to pass into the suction motor when the piston 7 is actuated with the cut-off valve 22 in closed position.

In operation of my device, when the transmission is in neutral, low, or reverse gear, the valve 22 will be closed by means of the spring 34 each time the clutch pedal 28 is depressed to disengage the clutch. If it is desired to hold the brakes in applied position without maintaining the foot on the brake pedal,—as for example, when starting the vehicle on an incline—the brake pedal is first depressed, thus applying the brakes by means of the suction motor. If the clutch pedal is not in depressed position, air under atmospheric pressure will enter the suction motor to the rear of the piston through conduit 21. Subsequent depression of the clutch pedal will close the valve 22 and trap the air in the suction motor, thereby preventing the brakes from being released when the foot is removed from the brake pedal. If the valve 22 is closed by operation of the clutch pedal prior to application of the brakes, the brakes will not be prevented from being applied by the depression of the brake pedal since, under these conditions, the non-return valve 38 will permit air to enter the suction motor at the rear of its piston. Release of the clutch pedal automatically releases the brakes. It is thus seen that in starting the vehicle the right foot may be used to operate the accelerator and the brakes released when the clutch is engaged.

When the transmission is in its highest or next to highest speed position, the shift rod 30 will be in such position that the spring 34 will be expanded, placing the lever in engagement with the shoulder 36. Under these conditions, when the clutch pedal 28 is depressed the valve 22 will not be operated to hold the brakes applied and the brakes will be operable in the usual manner. It is thus seen that the operator, in bringing the vehicle to a stop in high or next to high gear, may hold the clutch disengaged and apply and release the brakes as desired to bring the vehicle to the proper stopping point.

It is well known that air is compressible and, therefore, the trapped air in the portion of the suction chamber to the rear of the piston, by its compressibility, will permit the brakes to be slightly released unless some means is provided to compensate for this action. In accordance with one feature of my invention I provide rod 6 with a yieldable joint 39, the spring of which will be compressed when the brakes are applied. When the brakes are held in applied position by means of the trapped air in the suction motor, the releasing movement of the piston permitted by the compressibility of the air, will be partially absorbed by the spring of the joint 39, thus tending to hold the brakes in their original applied position.

Referring to Figure 2, I have disclosed a modification of the structure of Figure 1, whereby the brakes may be held in applied position. Instead of trapping air in the chamber of the suction motor to the rear of the piston, the cut-off valve 22 is placed in the conduit 9 leading from the suction motor to the control valve 11. The arm 27 of this valve is connected by means of the rods 29 and 32 to the clutch pedal and transmission, respectively, in the same manner as in Figure 1. In this structure the chamber to the rear of the piston does not have to be fluid-tight, nor is it necessary to provide a spring-actuated non-return valve as this chamber is at all times open to the atmosphere by means of the passage 40. The operation of this structure is the same as that disclosed in Figure 1 except that the piston 7 is held in its applied position by maintaining the vacuum ahead of the piston instead of maintaining a body of entrapped air at the rear of the piston.

Referring to Figure 3, I have shown my invention applied to an hydraulically-actuated braking system which is operated by a suction motor. In this construction the brake rod 12 is connected to a lever 41, the lower arm of which is secured to the piston 7' of the suction motor 8'. The suction motor is in communication with the manifold of the engine by means of conduits 9 and 11 and the control valve 10, the latter being actuated by the pedal 19. The compressor 42 of the hydraulic brake system is of the usual type, it being provided with a cylinder 43, a piston 44, and a reservoir 45, communication between the reservoir and the cylinder being permitted by the port 46 when the piston is in its retracted position. Conduit 47 leads from the compressor to the usual brake cylinder (not shown). The suction motor is directly attached to the rear of the compensator, and the piston 7' thereof is provided with a rod 48 for actuating the compressor piston 44, the rod passing through a packing gland 49 in order to produce a fluid-tight chamber 49 at the rear of the piston 44. A suitable packing cup 50 is also provided at the rear of the piston to prevent liquid from passing the piston upon its return movement but permitting liquid to flow past the periphery of the rear of the piston (which is provided with longitudinal grooves 50') and the periphery of the packing cup 50 (by collapse of the periphery of the cup) when the piston is moved in pressure applying direction. The chamber 49 to the rear of the compensator piston is in communication with the reservoir 45 by means of a passage 51, which passage is provided with a valve 52, the operating arm 53 of which is connected by means of the rods 29 and 32 to the clutch pedal and to the transmission in the same manner as described with respect to Figure 1. A suitable spring 54 biases pistons 7' and 44 toward their normal or retracted positions.

In operation of this modification, when the brake pedal 19 is depressed to place the manifold in communication with the suction motor, the piston 7' will be forced to the right, thereby operating the compressor piston to force fluid into the brake line 47 and apply the brakes after the port 46 has been closed. As the compressor piston is moved in applying the brakes, fluid from the reservoir will pass into the chamber to the rear of the piston by means of the passage 51. If it is desired to hold the brakes, applied, the clutch pedal 28 need only be depressed, whereby the spring 34 will close the valve 52, thus trapping fluid in the chamber to the rear of the piston 44 and preventing the return of the piston. The suction piston will also be prevented from returning to its normal position when the brake pedal has been released since the rod 48 is secured to the piston 44. In order to permit the brakes to be applied when the valve 52 is in closed position, a passage 55 is provided between the reservoir and the annular recess 56 of the compressor piston 44. When the piston 44 is moved to apply the brakes, fluid will be permitted to flow past the rear of the piston by means of grooves 50' and the cup 50 (the periphery of which collapses) into the fluid chamber, thus filling said chamber with fluid which will be maintained therein as long as the valve 52 is closed.

Having fully described my invention, what I claim as new and desire to secure by Letters Patent of the United States is:

1. The combination with the clutch mechanism and the braking mechanism of a motor vehicle, of power means for applying the brakes and comprising a cylinder and piston, one end of the cylinder being in communication with a source of suction and the other end of the cylinder being provided with a passage communicating with the atmosphere, and means operable when the clutch is disengaged for closing said passage, said last named cylinder end being in communication with the atmosphere at all times through said passage except when the passage is closed by the last named means.

2. The combination with the clutch mechanism and the braking mechanism of a motor vehicle, of power means for applying the brakes and comprising a cylinder and piston, one end of the cylinder being in communication with a source of suction and the other end of the cylinder being provided with a passage communicating with the atmosphere, means operable when the clutch is disengaged for closing said passage, and a non-return valve for permitting air under atmospheric pressure to enter said last named end of the cylinder.

3. The combination with the clutch mechanism, the braking mechanism, and the change speed mechanism of a motor vehicle, of power means for applying the brakes and comprising a suction motor, manual brake applying means, a conduit leading from the motor to a source of suction, a control valve in said conduit operated by said manual means, a second valve in said conduit operable when the clutch is disengaged for closing the conduit, and means for preventing said second valve from being operated to close the conduit when the transmission is in a selected speed ratio.

4. The combination with the clutch mechanism, the braking mechanism, and the change speed transmission of a motor vehicle, of power means for applying the brakes, holding means operable when the clutch is disengaged for preventing release of said brakes from applied position when the power of the power means is released, and means operable when the change speed transmission is in a selected speed ratio for rendering said holding means inoperative when the clutch is disengaged.

5. The combination with the clutch mechanism, the braking mechanism, and the change speed transmission of a motor vehicle, of power means for applying the brakes, means operable when the clutch is disengaged for preventing release of said brakes from applied position when the power of the power means is released, and means operable when the change speed transmission is in its highest or next to highest speed ratio for rendering said holding means inoperative when the clutch is disengaged.

6. The combination with the clutch mechanism, the change speed transmission mechanism, and the compressor of a hydraulic braking system, of power means for actuating the compressor piston and comprising a suction motor, means operable when the clutch is disengaged for preventing said compressor piston from movement toward released position of the brakes, and means operable when the transmission is in a selected speed ratio for rendering said last named means inoperative.

7. In a motor vehicle provided with a clutch mechanism and a fluid braking system, said braking system comprising a cylinder, a piston reciprocable therein and adapted to force fluid out of the forward end of the cylinder to apply the brakes, a fluid reservoir communicating with the portion of the cylinder to the rear of the piston, and means for operating the piston, the combination of means for retaining fluid in the cylinder at the rear of the piston when said piston is in a brake applying position, said means being operable when the clutch mechanism is moved to disengage the clutch.

8. In apparatus of the class described, the combination of a fluid compressor comprising a cylinder, a piston reciprocable therein and adapted to force fluid out of the forward end of the cylinder, a fluid reservoir and a passage between the reservoir and the portion of the cylinder to the rear of the piston, means for reciprocating the piston, a clutch mechanism, and valve means for closing said passage when the clutch mechanism is moved to disengage the clutch.

9. In hydraulic braking apparatus, the combination of a cylinder, a piston reciprocable therein and movable forwardly to force fluid out of the forward end of the cylinder to apply the brakes and rearwardly to release the brakes, a reservoir for said cylinder, means forming a passage between the reservoir and the portion of the cylinder to the rear of the piston, and a valve for closing said passage.

10. In hydraulic braking apparatus, the combination of a cylinder, a piston reciprocable therein and adapted to force fluid out of the forward end of the cylinder to apply the brakes, a reservoir for said cylinder, means forming a passage between the reservoir and the portion of the cylinder to the rear of the piston, a valve for closing said passage, and means for permitting fluid to flow into said cylinder portion from said reservoir when the valve is closed and the piston is actuated in brake applying direction.

11. In apparatus of the class described, the combination of a braking mechanism, fluid operated power means for applying the brakes and comprising a cylinder, a piston, and a connection between the piston and the brakes, said cylinder being provided with means for maintaining a body of compressible fluid at the rear of the piston to prevent said piston from returning to its normal position to release the brakes, and means in the connection for preventing the entire movement of the piston in a fluid compressing direction from being transferred to the braking mechanism.

12. In a motor vehicle, a change speed transmission, a braking system, power-operated means for applying the brakes, a manual control for said power-operated means, means for preventing the power-operated means from releasing the brakes notwithstanding the manual control assumes a brake releasing position, and means controlled by an element of the transmission for rendering said brake release preventing means inoperative.

13. In hydraulic braking apparatus, the combination of a cylinder, a piston reciprocable therein and adapted to force fluid out of the forward end of the cylinder to apply the brakes, a reservoir for said cylinder, means forming a passage between the reservoir and the portion of the cylinder to the rear of the piston, means for closing said passage, and means for permitting fluid to flow into said cylinder portion from said reservoir when the piston is actuated in brake applying direction.

14. The combination with the clutch mechanism and the braking mechanism of a motor vehicle, of power means for applying the brakes and comprising a piston and cylinder, control means for the power means, means for preventing said piston after being caused by the control means to move forwardly in the cylinder to brake-applied position from moving to brake release position notwithstanding the control means assumes a position to release the brakes, said means comprising means for trapping fluid at the rear of the piston, and means for operating said last named means when the clutch is disengaged.

15. In a motor vehicle, a braking system, a suction motor comprising a piston and a cylinder for applying the brakes, a manually-controlled valve for controlling the suction motor, means for normally placing the cylinder of the suction motor at the rear of its piston in communication with the atmosphere, and valve means for cutting off said communication and thereby trap fluid at the rear of the suction motor piston to maintain the brakes in applied position notwithstanding the manually-controlled valve assumes a position to permit return of the piston to non-brake applying position.

16. In apparatus of the class described, a clutch mechanism, a hydraulic braking system having a compressor including a piston and a cylinder, power means for actuating the compressor and comprising a suction motor, control means for the power means, and means operable when the clutch is disengaged for preventing said compressor piston from movement toward released position of the brakes notwithstanding the control means assumes a position to release the brakes.

17. The combination with the clutch mechanism and the braking mechanism of a motor vehicle, of power means for applying the brakes and comprising a suction motor having a chamber and a movable element therein, manual brake applying means, a conduit for placing the chamber on one side of the movable element in communication with a source of suction, a control valve in said conduit operated by said manual means, and a second valve operable when the clutch is disengaged for trapping fluid in the chamber on the other side of the movable element to thereby prevent the brakes from being released notwithstanding the control valve assumes a position to release the brakes.

STEVE SCHNELL.